Feb. 10, 1959 P. J. H. JANSSEN 2,873,365

FREQUENCY DEMODULATOR

Filed Nov. 21, 1955

INVENTOR

PETER JOHANNES HUBERTUS JANSSEN

BY Fred M. Vogel

AGENT

United States Patent Office 2,873,365

Patented Feb. 10, 1959

2,873,365

FREQUENCY DEMODULATOR

Peter Johannes Hubertus Janssen, Eindhoven, Netherlands, assignor, by mesne assignments, to North American Philips Company, Inc., New York, N. Y., a corporation of Delaware Application November 21, 1955, Serial No. 548,201

Claims priority, application Netherlands December 11, 1954

3 Claims. (Cl. 250—27)

The invention relates to a circuit arrangement for the demodulation of frequency-modulated signal currents having unwanted amplitude-modulation by means of a push-pull frequency demodulator comprising a primary parallel-resonance circuit followed by a secondary parallel-resonance circuit and two push-pull rectifiers coupled with these circuits and having a common output filter, a limiter coupled with the primary circuit providing not only a partial suppression of the unwanted amplitude modulation, but also introducing such a distortion of the signal voltages that the unwanted amplitude modulation of the demodulated signal produced at the output of the filter is reduced materially further.

Such a circuit arrangement is described in the prior patent application Serial No. 463,508, filed October 20, 1954, in which it is stated that with a correct adjustment of the limiter the signal distortion produced results in these desired phenomena.

However, this prior circuit arrangement gives rise to difficulties if the signal currents to be demodulated have an appreciable distortion, which may, for example, be the case with the reception of very strong input signals, if an amplifying tube supplying these signal currents is driven up to its grid current. The resultant, additional distortion of the signal voltages puts out of order the signal distortion produced by the limiter, so that the desired insensitivity of the demodulated signal to amplitude modulation is no longer obtained.

The invention provides a circuit arrangement in which this disadvantage is obviated. It has the characteristic that the primary resonant circuit comprises at least three reactances, which are connected as a filter for attenuating the higher harmonics of the signal voltages to provide additionally a suppression of occuring signal-voltage distortion due to any initial distortion of the signal currents.

The invention will be described with reference to the drawing.

Figures 1, 2:
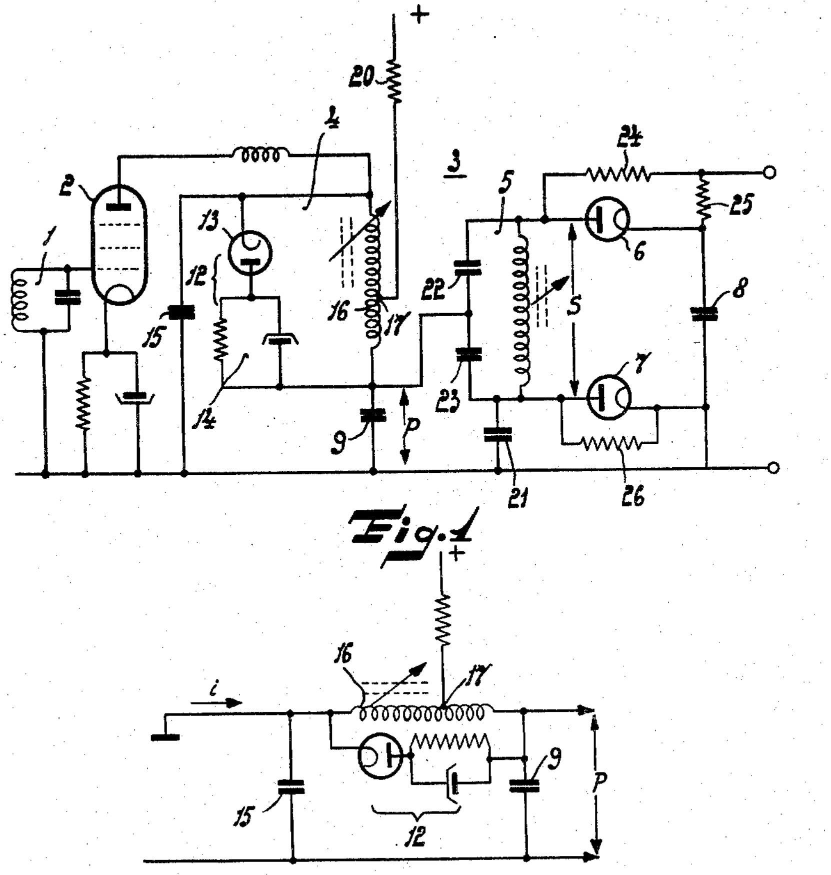
Fig. 1 shows one embodiment of the invention.
Fig. 2 shows part of the embodiment shown in Fig. 1 to explain the operation of the circuit arrangement.

According to Fig. 1 frequency-modulated signal oscillations with unwanted amplitude modulation are fed via an input circuit 1, subsequent to amplification in a tube 2, to a push-pull frequency demodulator 3, comprising a primary circuit 4, followed by a secondary circuit 5, coupled capacitatively with the former, two push-pull rectifiers 6 and 7 and a common output filter 8. The voltage P produced across a capacitor 9 of the primary circuit 4 is fed in co-phase to the rectifiers 6 and 7, whereas the voltage S produced by this voltage P across the secondary circuit is fed in push-pull to these rectifiers 6 and 7, the phase shift varying with the frequency modulation between the voltages P and S producing, in known manner, a demodulated signal across the filter 8.

According to the said prior patent application a limiter 12, comprising for example a rectifier 13 in series with a resistor 14, decoupled for the modulation frequency, is coupled with the primary circuit 4 in a manner such that the unwanted amplitude modulation is not only partly suppresed, but also the voltage P is distorted. With a correct adjustment of the limiter 12 the unwanted amplitude modulation of the output signal produced across the filter 8 may be materially further reduced.

It is now found, however, that, if the signal oscillations across the circuit 1 were already distorted initially, for example due to grid current of the tube 2 at the reception of a strong signal, the corresponding distortion of the signal current across the circuit 4 produces an additional distortion of the voltage P, so that the aforesaid adjustment is put out of order and hence the unwanted amplitude modulation of the demodulated signal is again high.

According to the invention the circuit 4 is composed of at least three reactances in a manner such that it operates as an attenuator for the higher harmonics, i. e. of the distortion components of the voltage P, as far as these harmonics initiate from the signal currents supplied by the tube 2. The remaining distortion of the voltage P is then only that which is introduced by the limiter 12, so that the desired adjustment is maintained.

The circuit 4 is composed, to this end, in its simplest form, not only the capacitor 9, but also of a second capacitor 15 and an inductor 16, of which, preferably, a tapping 17 is connected to the positive terminal of the supply voltage. The limiter 12 is connected in parallel with the inductor 16. Of course, a more complicated network could be used.

Fig. 2 shows this part of the embodiment shown in Fig. 1.

The circuit 15—16—9 is in resonance with the fundamental frequency of the alternating signal voltage *i*, so that by step-up transformation an appreciable voltage P is produced. The harmonics of the current *i*, however, are attenuated to a considerably greater extent not only by the limiter 12, but also by the filter effect of the inductor 16 with the capacitors 15 and 9 than with the use of a resonant circuit comprising only one inductor and one capacitor. The limiter 12 then produces not only a partial suppression of the unwanted amplitude modulation of the signal voltages across each of the reactances 9, 15 and 16, but also a constant degree of signal distortion of the voltage across the inductor 16 and hence also of the voltage P across the capacitor 9, so that a constant adjustment of this distortion may be obtained substantially independent of the distortion of the signal current *i*.

The tapping 17 is preferably chosen to be such that the signal voltage at this tapping is exactly equal to zero, so that unwanted parasitic phenomena are avoided. The number of turns of the inductor 16 to the left and to the right of this tapping 17 must to this end be proportional to the impedance value of the capacitors 15 and 9.

In a practical embodiment the circuit elements had the following values: filter 8, 56 pf.; capacitor 9, 27 pf.; filter 14, 22K ohms and 5 $\mu$f.; capacitor 15, 10 pf.; resistor 20, 5.6K ohms; capacitor 21, 10 pf.; capacitor 22, 56 pf.; capacitor 23, 47 pf.; resistor 24, 47K ohms; resistor 25, 10K ohms; resistor 26, 56K ohms.

What is claimed is:

1. A circuit for demodulating frequency-modulated signals subject to having undesired distortion and amplitude modulation, comprising a resonant primary circuit connected to receive said signals and having an inductor and at least two capacitors connected in series and tuned to comprise a filter for attenuating said undesired distortion, a common junction between two of said capacitors being connected to a source of reference potential, a resonant secondary circuit coupled capacitively to said primary circuit, a detector comprising a pair of rectifiers respectively connected to said secondary circuit to receive a push-pull signal therefrom, signal conducting means connected between one of said capacitors and said secondary circuit to apply a co-phase signal to said rectifiers, and a limiter connected across at least a portion of said inductor to partially limit said undesired amplitude modulation across said inductor, thereby producing a desired amount of distortion of said signals, whereby said primary circuit attenuates said undesired distortion without attenuating said desired distortion.

2. A circuit as claimed in claim 1, in which said primary circuit comprises an inductor and two capacitors connected in a closed series circuit, means connected to apply said frequency-modulated signals across a first one of the last-named two capacitors, and means coupling said secondary circuit to the second one of said last-named two capacitors to produce said co-phase signal across said secondary circuit, said limiter being connected directly across said inductor.

3. A circuit as claimed in claim 2, including an electron discharge device having an electrode connected to the junction of said inductor and said first capacitor so as to apply said signals thereto, and a source of operating voltage for said electron discharge device connected to a point on said inductor.

References Cited in the file of this patent

UNITED STATES PATENTS

| | | |
|---|---|---|
| 2,353,468 | Holst | July 11, 1944 |
| 2,420,248 | Koch | May 6, 1947 |
| 2,698,899 | Boelens | Jan. 4, 1955 |

FOREIGN PATENTS

| | | |
|---|---|---|
| 704,178 | Great Britain | Feb. 17, 1954 |